April 30, 1957 E. D. REED 2,790,928

ELECTRON DISCHARGE DEVICES OF THE KLYSTRON TYPE

Filed Oct. 11, 1952 4 Sheets-Sheet 1

INVENTOR
E. D. REED
BY [signature]
ATTORNEY

INVENTOR
E. D. REED
BY [signature]
ATTORNEY

INVENTOR
E. D. REED
BY [signature]
ATTORNEY

April 30, 1957 E. D. REED 2,790,928

ELECTRON DISCHARGE DEVICES OF THE KLYSTRON TYPE

Filed Oct. 11, 1952 4 Sheets-Sheet 4

INVENTOR
E. D. REED
BY [signature]
ATTORNEY

United States Patent Office 2,790,928

Patented Apr. 30, 1957

2,790,928

ELECTRON DISCHARGE DEVICES OF THE KLYSTRON TYPE

Eugene D. Reed, West Orange, N. J., assignor to Bell Telephone Laboratories, Incorporated, New York, N. Y., a corporation of New York Application October 11, 1952, Serial No. 314,239

6 Claims. (Cl. 315—5.21)

This invention relates to electron discharge devices and more particularly to such devices of the klystron type.

Klystrons and particularly of the reflex type have found various applications as high frequency devices and particularly as oscillators but in certain instances limitations have been imposed on their use. Thus one known use of reflex klystrons is as sweeping oscillators for the testing of high frequency equipment, the oscillator being tuned or swept over a band of frequencies. This sweep band may be either at the frequency of operation of the klystron itself or may be beaten down by a local oscillator to some other frequency region. In this manner, such microwave or radio frequency components as wave guides, filters, amplifiers, etc., may be readily tested over the expected frequency range of operation.

The tuning of the klystron to effect this sweeping over a prescribed frequency band may be achieved in either of two ways referred to as electronic tuning and mechanical tuning. In mechanical tuning the dimensions of the cavity resonator are changed, as by inserting a plunger; the repeller electrode voltage must also be changed in synchronism with the dimensional changes of the resonator to assure that the klystron remains in oscillation and delivers peak power. This method of tuning, when employed to produce a recurrent frequency sweep, results in wide band widths but suffers from the disadvantage of requiring considerable associated equipment and circuitry. In electronic tuning only the repeller voltage is varied. While electronic tuning is basically considerably simpler than mechanical tuning it priorly has had the disadvantage that the klystron will deliver maximum power at only one frequency and considerably less amounts of power at other frequencies within the frequency band, whereas by mechanically varying the dimensions of the cavity resonator the klystron can be made to deliver essentially constant power over a considerable band of frequencies. Electronic tuning therefore has not been able to attain the sweep band widths obtainable with mechanical tuning.

It is therefore an object of this invention to provide a klystron having a cavity resonator of fixed dimensions associated therewith that is capable of delivering substantially constant power over a wide frequency band.

In certain other applications, the variations in power over a tuning range may be of secondary importance whereas it is of prime importance that there be a substantially linear relationship between the voltage applied to the repeller electrode and the operating frequency of the klystron. Such is the case when klystrons are employed as frequency modulated transmitting oscillators. Priorly a linear relationship has not been attainable, and the distortions introduced thereby have been corrected for by external circuitry.

It is another object of this invention to provide a reflex klystron having a directly linear relationship between repeller voltage and frequency of operation.

Klystrons are also employed in automatic frequency control systems where it may be desired to track over a wide frequency band, and neither the maximum power flatness nor modulation linearity are of as great importance as the one-half power frequency band, that is the range in frequency between the two frequencies at which the klystron will deliver one-half its maximum power, though other percentages of maximum power may be designated in a particular system.

It is a further object of this invention to increase the frequency band at specified percentages of the maximum power output and more particularly to increase the one-half power frequency band of klystrons employed in automatic frequency control systems.

It is a general object of this invention to provide an improved reflex klystron. A further general object is to broaden the fields of application and the usefulness of klystrons of both the reflex and double cavity types.

These and other objects of this invention are attained in accordance with features of this invention by the provision of a secondary cavity resonator coupled to the primary cavity resonator and remote from the output terminal thereof. Priorly secondary cavity resonators have occasionally been employed with klystrons, the electron stream being projected through the primary resonator and the power output, whether through a coaxial terminal or a wave guide iris, being taken from the secondary high-Q resonator. The power flow has thus been directly through both resonators. In this manner the frequency stability of the klystron may be increased if operated at a fixed frequency. In accordance with my invention, however, the secondary cavity resonator while directly coupled to the primary resonator is remote from the power output so that no power is delivered through it to the output circuit.

By varying the tightness of the coupling between the two resonators as well as the Q's of the cavities any of the advantageous results described above may be attained. The coupling coefficient, K, is generally defined by the expression $$K=\frac{M}{\sqrt{L_1L_2}}$$

where M is the mutual inductance between the two resonators and $L_1$ and $L_2$ are the inductive portions of the impedances of the resonators. The Q of a resonator is defined as $2\pi$ times the ratio of energy stored to energy dissipated per cycle in the resonator and is given by the expression $$Q=\frac{\omega_0 C}{G}$$

where $\omega_0$ is the midband frequency for that mode of operation and C and G are the lumped circuit elements, described further below with reference to the drawing. I have found that for optimum broad band operation the Q of the secondary resonator, $Q_s$, should advantageously be from one quarter to three quarters of the Q of the primary resonator and that the product $Q_sK$ should be within the range of from .1 to 1. Within this range of relationships between the two cavities the klystron can deliver substantially constant power output while being electronically tuned over a relatively wide frequency range. Specifically I have found it advantageous in certain illustrative embodiments if the Q of the second cavity is approximately between .3 and .4 of the first resonant cavity and the product $Q_sK$ be approximately from .8 to .9. I have also found that a relationship between the cavities such that $KQ_s$ is substantially .13 enables the klystron to have a substantially linear relationship between repeller voltage and frequency of operation. While the criteria for these two optimum conditions of operation may overlap, they are independent of each other and may be considered entirely apart from each other.

It is a feature of this invention that a pair of cavity resonators be employed with a klystron, the primary cavity including a gap across which the electron beam is projected and having the power output terminal coupled thereto and the secondary cavity being directly coupled to the primary cavity and remote from the power output terminal and from the electron beam.

It is a further feature of this invention that the tightness of the coupling between the primary and secondary cavities and the losses of the cavities be such that either a substantially constant power output over a wide band of frequencies is attained as the klystron is electronically tuned or the repeller voltage is linearly related to the frequency of operation of the klystron.

A complete understanding of this invention and of these and various other desirable features thereof may be gained from consideration of the following detailed description and the accompanying drawing, in which.

Figure 1:
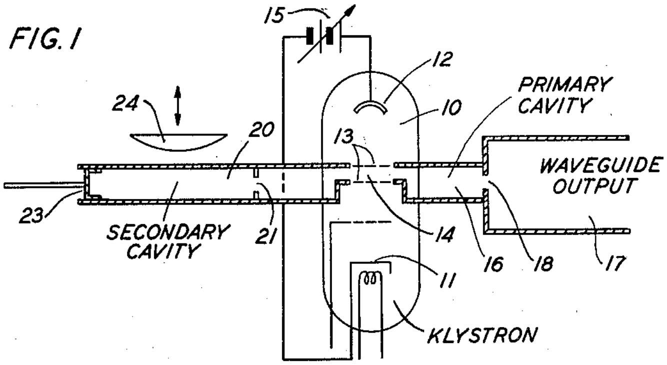
Fig. 1 is a schematic representation of one specific illustrative embodiment of this invention.

Referring now to the drawing one embodiment of this invention is depicted schematically in Fig. 1 and comprises a reflex klystron 10 having a cathode 11, a repeller electrode 12, and a pair of foraminous members 13 defining a gap 14 across which the electron stream is projected. A variable direct current voltage is applied to the repeller electrode 12 by a source 15. The gap 14 is included within the primary resonant cavity 16, as is known in the art, and an output circuit 17, which may comprise a wave guide output, is coupled to primary resonant cavity 16 by a coupling iris or window 18 interposed therebetween. In accordance with my invention a secondary resonant cavity 20 is also coupled to the primary cavity 16, as by a second coupling iris or window 21. Advantageously the amount of coupling may be varied. This secondary cavity 20 may advantageously be tunable, as by tuning plunger 23 insertable therein. and have its Q varied by the insertion therein of a resistance vane 24.

Figure 2:
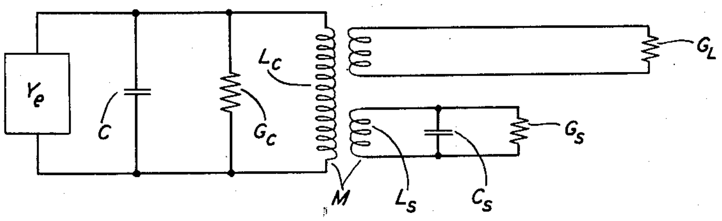
Fig. 2 is the equivalent circuit of the embodiment of Fig. 1.

Fig. 2 represents the lumped circuit analogy of the circuit of Fig. 1. As is well known there are two admittances appearing across the resonator gap 14; one of these, $Y_e$, is due to the presence of the velocity modulated electron stream and the other, identified as Y, is the input admittance of the resonant circuit of which the gap 14 is a part. The magnitude and phase of $Y_e$ depend solely on the electron optics of the system, i. e., on the accelerating voltage $V_0$, the direct current beam current $I_0$, the repeller voltage $V_R$, the beam coupling coefficient $\beta$, the electrode spacings and the magnitude of the radio frequency voltage existing across the gap 14. When the last is very small, such as during the initial stages of the build-up of oscillations, the electronic admittance $Y_e$ is called the "small signal" electronic admittance, $Y_{es}$.

The input admitance of the resonant circuit may be represented by the gap capacitance C, inductance $L_c$ and the shunt conductance of the resonator by $G_c$. Coupled thereto and forming a part of the input admittance Y are the load conductance $G_L$ and the admittance of the secondary cavity 23 comprising the cavity capacitance $C_s$, inductance $L_c$ and shunt conductance $G_s$.

Figure 3:
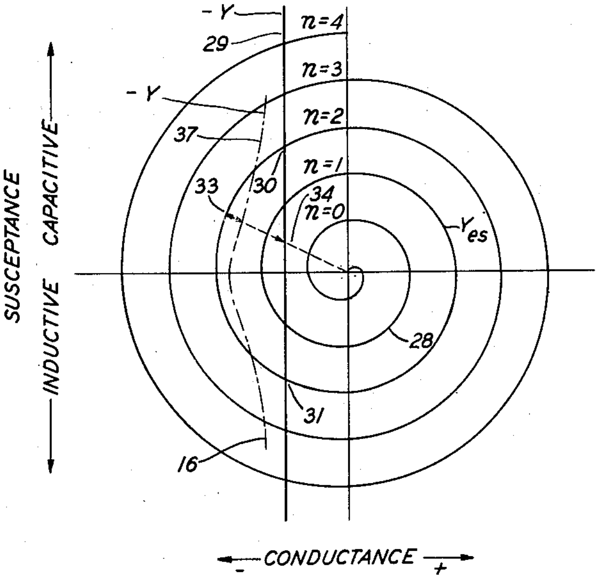
Fig. 3 is a plot of small signal electronic admittance and circuit admittance for both prior art klystrons and the embodiment of Fig. 1.

Turning now to Fig. 3 the small-signal admittance $Y_{es}$ is there plotted in a complex admittance plane. As is known, in this plot $Y_{es}$ takes the form of a spiral 28 in which successive turns correspond to successive modes of operation $n$, the number of cycles of drift time in the repeller region for maximum power output in a particular mode being $(n+3/4)$. The input admittance Y of the single coupled resonator of the prior art is given by the expression $$Y=G+j2C\Delta\omega$$

where G is the sum of $G_C$ and $G_L$, the latter referred to the resonator gap, and is represented by a straight line 29 in Fig. 3. Line 29 actually represents $-Y$ as the condition for oscillation requires that $$Y_e+Y=0$$

or that $$Y_e=-Y$$

When oscillations build up, the electronic admittance vector shrinks along the radius vector from its small signal value $Y_{es}$ to its steady state value, which is equal to $-Y$, without any change in phase angle as, for a fixed repeller voltage, a change in the radio frequency gap voltage only affects the magnitude of the $Y_e$-vector and not its phase. Fig. 3 thus shows the conditions pertaining both to the start of the build up of oscillations and to the steady state, and much valuable information can be gleaned from it including whether oscillations will build up or not. As can be seen at points 30 and 31 where the line 29 intersects the spiral in the $n=2$ mode the condition for oscillation is exactly satisfied for a zero gap voltage. To the left of the line 29 there exists an excess of negative electronic conductance over the passive circuit conductance and hence oscillation is possible while to the right of the line 29 oscillations cannot be maintained. Thus for the particular case shown in Fig. 3 oscillation is possible in the $n=1$, $n=2$, and the higher order modes while oscillation can not be maintained in the $n=0$ mode. Further, the frequency range of operation in any mode is limited to the length of the line 29 between the intersections of that line with the small signal electronic admittance spiral, the susceptance variations along line 29 being linearly related to the frequency deviation from the frequency at the center of the mode. Thus for oscillation in the $n=2$ mode the electronic tuning range is limited to the frequency range corresponding to the distance between the points 30 and 31. A fuller description of the operation of single cavity reflex oscillators and of the theory of electronic admittance may be found in the article "Reflex oscillators" by J. R. Pierce and W. G. Shepherd at volume 26, page 460 of the Bell System Technical Journal (July 1947), and the above discussion is subject to the assumptions made by Pierce and Shepherd.

Each point on the spiral 28 represents a particular repeller voltage. The power output obtainable at that repeller voltage is related to the excess electronic admittance at that mode. Thus when the repeller voltage corresponds to the point 33 on the spiral 28, the power output attainable is proportional—though not linearly—to the distance along dotted line 34 between the point 33 and line 29, the exact relationship being dependent on the ratio of this distance to the total length of the line 34 and other factors.

The input admittance characteristic for a klystron having both a primary and a secondary cavity resonator, in accordance with my invention, is not a straight line but is represented by curve 37. The sharpness of the apex of this curve at the intersection thereof with the conductance axis is dependent in part upon the tightness of the coupling between the two resonant cavities 16 and 20 and on their relative Q's. If the cavities are coupled too tightly curve 37 may in fact go through a slight loop around the conductance axis and there will thus result a region of unstable oscillation.

The power output attainable from a reflex oscillator in accordance with my invention corresponds to the distance along line 34 between the spiral 28 and the curve 37 for the particular repeller voltage represented by point 33 on spiral 28. As can be seen in Fig. 3, curve 37 is substantially equidistant from spiral 28 over a wide range of repeller voltages. The substantially constant power output over a wide band of frequencies resulting from this relationship between the curve 37 and spiral 28 can readily be seen in Fig. 4 which is a plot of power output against deviation of frequency from the center of the mode, i. e., from the conductance axis, the frequency being charged by variations in the repeller voltage, as is known.

Figure 4:
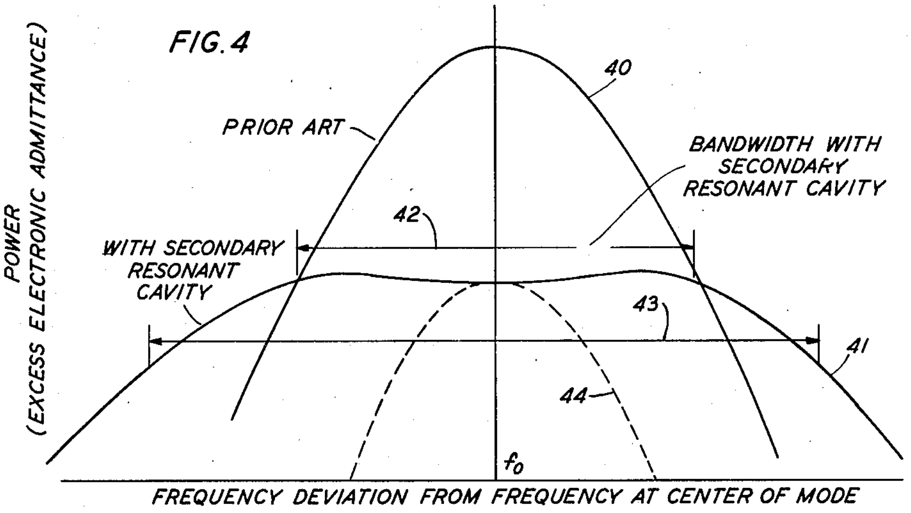
Fig. 4 is a graph of power output against frequency deviation from the frequency at the center of the mode for both prior art klystrons and in accordance with this invention.

As seen in Fig. 4 the power attainable with the primary resonant cavity alone, as known to the prior art, is shown by curve 40 and decreases rapidly from the maximum which occurs when the repeller voltage is such that the spiral 28 just intersects the conductance axis. This is because the distance between the line 29 and spiral 28 decreases constantly. The power output attainable in accordance with my invention is shown by curve 41 and, as can be seen, is substantially constant over a fairly wide band of frequencies. The maximum power is, however, below that attainable with only a single cavity as part of the available power is used in supplying the losses of the secondary cavity. Thus the curve 37 is always to the left of line 29 in the graph of Fig. 3. The band width over which the power is substantially constant is indicated in Fig. 4 by the line 42. Curve 44 shows the prior art mode shape normalized with respect to characteristics of the coupled cavity resonator construction in accordance with this invention such as to have the same mid-mode power. While it is unlikely that one would operate the single resonator of the prior art at less than its maximum power output, curve 44 indicates that doing so would not increase the frequency band for optimum power output under those conditions.

Line 43 on Fig. 4 indicates the half-power frequency band attainable in accordance with this invention. As indicated above the ability of a klystron to deliver at least half-power output (or some other percentage of maximum power output) over a wide range of frequencies is of importance in certain tracking operations. As is readily apparent from a consideration of line 43 and the prior art characteristic 40, the half-power electronic tuning range in accordance with this invention is more than double that attainable with prior art structures. Thus both the half-power tuning range and the frequency band for maximum power have been substantially increased in accordance with this invention.

It is therefore apparent that a reflex klystron in accordance with my invention may be operated as an electronically swept signal generator with substantially flat power output over a considerable frequency range. The shape of curve 37 and thus the flatness of the power curve 41 may be varied by varying the tightness of the coupling between the two cavities 16 and 20 and their Q's. If the Q's are approximately equal, the power available will be close to that indicated by curve 40 but will be slightly depressed at the center so as to be constant over a slight frequency range. If we consider variations in Q alone, as the secondary reasonator's Q is reduced the amount of available power becomes less, but the range over which that power is substantially constant increases considerably. This reduction in power is due to the losses of the secondary cavity. I have therefore found it advantageous to employ a secondary cavity having a Q of from approximately one quarter to three quarters the Q of the primary resonant cavity, though, as pointed out below, any value of Q might be used if the product $KQ_s$ is correctly chosen. The exact choice of values, however, will be a balance between the width of the frequency band over which it is desired to have a constant power output and the power level desired.

As indicated above, if the coupling between the two cavities is too tight the klystron will go through an unstable condition, which would be represented on the graph of Fig. 3 by a loop in curve 37 around the conductance axis. Increasing the coupling is indicated on the graph of Fig. 4 by a depression of curve 41 at the frequency $f_0$ which is the frequency at the center of the mode of operation, in the case illustrated, $n=2$. When the tightness of the coupling is increased to the point that the klystron goes through an unstable condition in the region where $f=f_0$ then the curve 41 of Fig. 4 is depressed in the middle such that its two arms cross each other at $f=f_0$ and power output ceases to be a single valued function of frequency. I have found that a coupling such that $KQ_s$ is in the range from approximately .1 to 1 is most advantageous.

In the specific illustrative embodiment from which the data for the graphs of Figs. 3 and 4 were obtained $Q_s$ was about .35 $Q_p$ and $KQ_s$ was .83; accordingly $Q_s$ may advantageously be from .3 to .4 $Q_p$ and $KQ_s$ may advantageously be from .8 to .9. In this specific illustrative embodiment, in which the structural embodiment described below with reference to Fig. 7 was employed, a flat power curve was obtained over a range of 30 megacycles while a substantially flat power curve in which the deviation was within $\pm 0.1$ decibel was obtained over a range of 60 megacycles, both at 3800 megacycles. The degree of flatness may be accurately controlled by varying the coupling between the two resonators and an absolutely flat power curve over a range of frequencies is attainable in accordance with my invention. Further substantially wider frequency bands of perfectly constant maximum power can be obtained with klystrons whose structure has been specifically designed for this application. The electron optics of the klystron has a direct effect upon the width of the frequency band of constant power and by reducing the effective gap capacitance and/or reducing the nose diameter of the electron optic system of the klystron, still wider frequency bands may be attained.

As a substantially constant power output is attainable in accordance with my invention over a wide band of frequencies, a klystron in accordance with my invention may readily be employed as a high frequency broadband amplifier. In such an application of this invention the klystron is advantageously of the double cavity type and a secondary resonant cavity may be utilized with either or both of the cavities through which the electron stream is projected.

Figure 6:
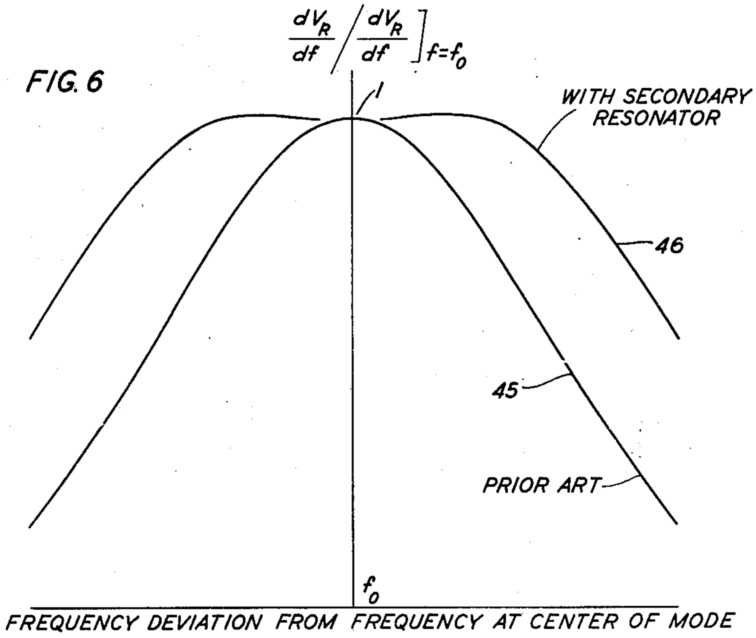
Fig. 6 is a graph of the rate of change of repeller voltage with frequency against frequency for both prior art klystrons and in accordance with this invention.
Figure 5:
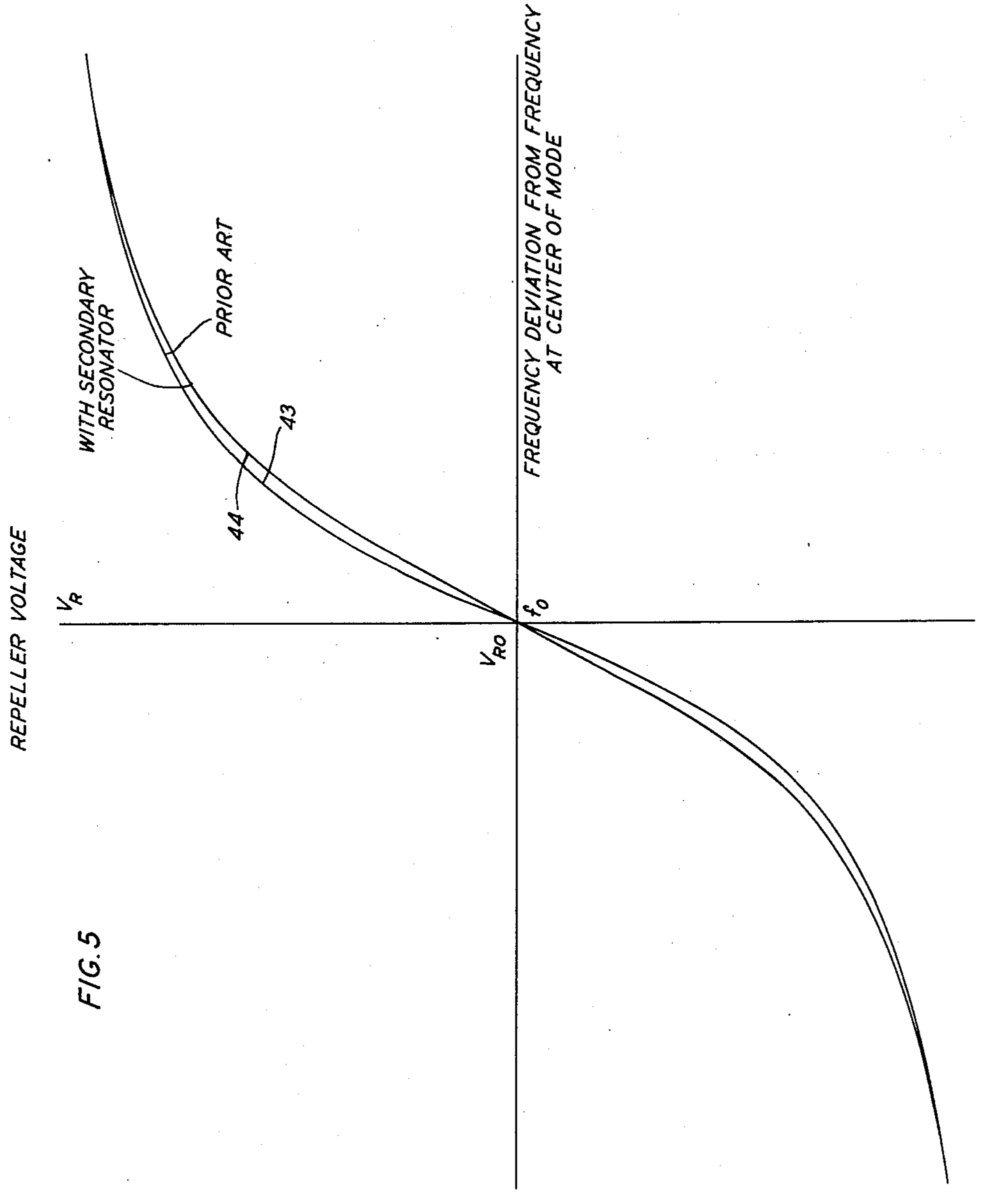
Fig. 5 is a graph of repeller voltage against frequency for both prior art klystrons and in accordance with this invention.

Turning now to Figs. 5 and 6 there are represented in graphical form data illustrating another important application of klystrons employing a secondary cavity resonator coupled to the primary resonator and remote from the output terminal from the primary resonator. Fig. 5 is a graph of repeller voltage against frequency deviation from the frequency $f_0$ at the center of the mode of operation, curve 43 being indicative of prior art devices employing but the single primary resonant cavity and curve 44 being a plot for a particular specific embodiment of this invention. The distinctions between curves 43 and 44 can best be seen in Fig. 6 where $$\frac{\frac{dV_R}{df}}{\left.\frac{dV_R}{df}\right]_{f_0}}$$

the ratio of the slope of the curves of Fig. 5 to their slopes at $f=f_0$, is plotted against the frequency deviation, the ratio being of course 1 at $f=f_0$ for both curves. Curve 45 is the plot of the ratio of the slopes of curve 43 of Fig. 5 and curve 46 that of curve 44 of Fig. 5. As can readily be seen the slope of the curve 43, as represented by curve 45, stays constant to its value at $f=f_0$ over a very short frequency range whereas the slope of curve 44, as represented by curve 46, stays constant over a considerably larger frequency range, and substantially constant, i. e., within ±1.0 percent, over a much wider frequency band. In one specific illustrative embodiment of this invention in which $Q_s$ was equal to $Q_p$ and $KQ_s$ was .13, the slope is substantially constant within ±1.0 percent over a frequency band of ±10 megacycles at 4000 megacycles. In this embodiment the Q's are both equal to 100.

Thus in accordance with my invention to obtain a substantially linear modulation relationship between the repeller voltage and the frequency of operation of the klystron the coefficient of coupling between the primary and secondary cavities should be such that the cavities are fairly lightly coupled together.

Figure 7:
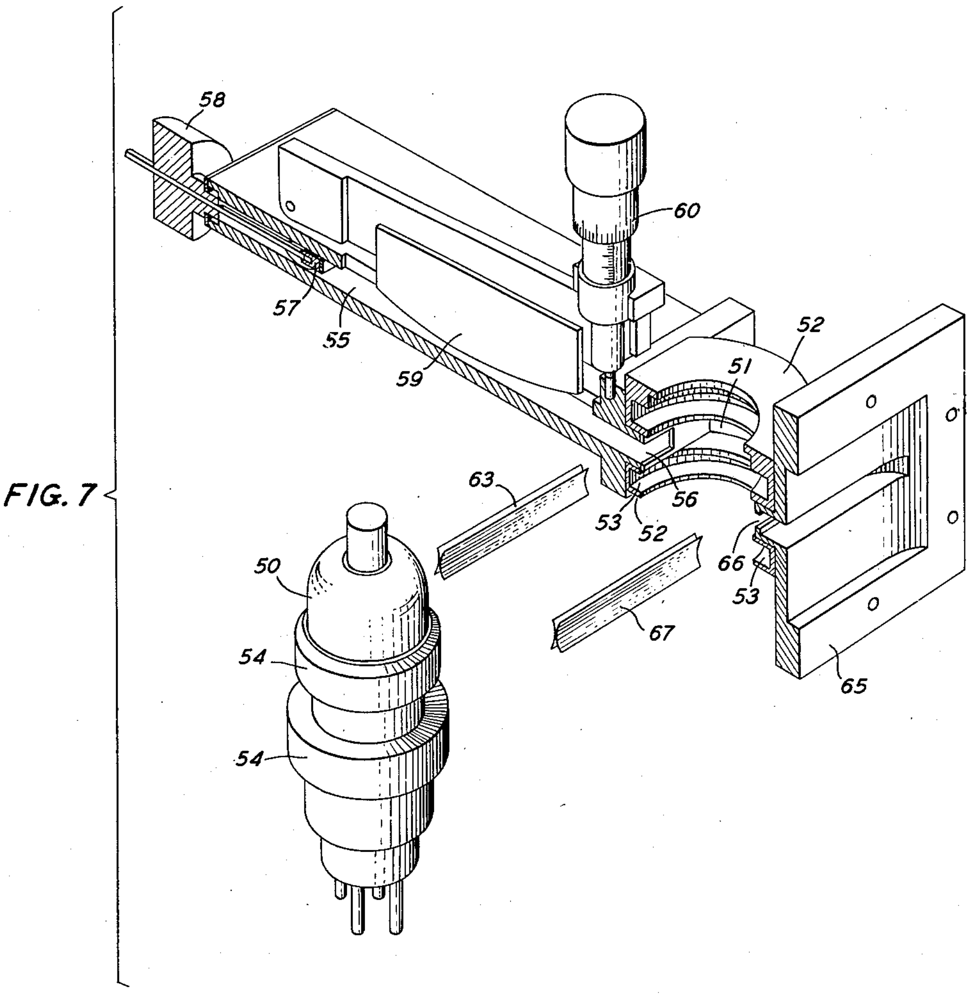
Fig. 7 is a partially exploded perspective view, partially in section, of one specific structural form of the embodiment of Fig. 1.

One specific structural embodiment of this invention is illustrated in Fig. 7 and comprises a reflex klystron 50, which may be of several known types such as the Sylvania 6BL6. The primary cavity 51 is bounded by two circular grooved members 52 having grooves 53 therein for toroidal contact springs which bear against metallic flanges 54 extending through the envelope of the klystron 50 and which, within the klystron, support the gap defining electrodes. The secondary cavity 55 is positioned to one side of the primary cavity and coupled thereto to a coupling iris 56. A tuning plunger 57 may advantageously extend into the secondary cavity 55, the position of the plunger 57 being controlled by a knob 58. A resistance vane 59 is also advantageously positioned in the secondary cavity 55, the extent of the intrusion of the resistance vane 59 into the secondary cavity 55 being controlled by a knob 60 to carefully vary the Q of the secondary cavity.

As described above the specific advantageous result attainable by my invention depends upon the Q of the secondary cavity 55 and the tightness of the coupling between the primary and secondary cavities. A shutter 63 is therefore positioned within the coupling iris 56 and capable of sliding thereacross to control the coefficient of coupling.

A standard output wave guide flange 65 is secured to the primary cavity defining members 52 to the opposite side thereof from the secondary cavity 55. An output wave guide is advantageously attached to the wave guide flange 65 and comprises the output terminal of the device, as is known in the art. The flange 65 is coupled to the primary cavity 55 by an output iris 66 and the coefficient of coupling between the primary cavity 55 and the output wave guide terminal may also be varied by a shutter 67 slidable across the output iris 66.

It is to be understood that the above-described arrangements are illustrative of the application of the principles of the invention. Numerous other arrangements may be devised by those skilled in the art without departing from the spirit and scope of the invention.

What is claimed is:

1. An electron discharge device of the klystron type comprising electrode means defining a gap, means for projecting a stream of electrons through said gap, a first resonant cavity including said gap, output means connected to said first resonant cavity for removing power therefrom, and a second resonant cavity coupled to said first resonant cavity, the Q of said second resonant cavity being approximately from one quarter to three quarters the Q of the first resonant cavity and the coupling between the two cavities being such that $KQ_s$ is from .1 to 1, where K is the coupling coefficient between the two cavities and $Q_s$ is the Q of the second resonant cavity.

2. An electron discharge device of the klystron type comprising electrode means defining a gap, a first resonant cavity including said gap, output means connected to said first resonant cavity, and a second resonant cavity coupled to said first resonant cavity and remote from said output means, the Q of said second resonant cavity being approximately between .3 and .4 of the first resonant cavity and the product of the Q of said second resonant cavity and the coefficient of coupling between said two cavities being approximately between .8 and .9.

3. An electron discharge device of the reflex oscillator type comprising electrode means defining a gap, means for projecting a stream of electrons across said gap, a repeller electrode opposite said electron projecting means, a first resonant cavity including said gap, output means connected to said first resonant cavity, and means for obtaining a substantially linear relationship between output frequency and repeller electrode voltage over a wide band of frequencies comprising a second resonant cavity loosely coupled to said first resonant cavity and remote from said output means.

4. An electron discharge device in accordance with claim 3 wherein the product of the Q of the second resonant cavity and the coefficient of coupling between said cavities is approximately .13.

5. A sweep frequency oscillator for delivering substantially constant power output over the sweep band of frequencies comprising a reflex klystron having electrode means defining a gap, means for projecting a stream of electrons through said gap, a repeller electrode opposite said electron projecting means, a first resonant cavity including said gap, and output means connected to said first resonant cavity for removing power therefrom, means for applying a direct current voltage to said repeller electrode electronically to tune said klystron, and a second resonant cavity coupled to said first resonant cavity, the Q of said second resonant cavity being approximately from one-quarter to three-quarters the Q of the first resonant cavity and the coupling between the two cavities being such that $KQ_s$ is from .1 to 1 where K is the coupling coefficient between the two cavities and $Q_s$ is the Q of said secondary resonant cavity.

6. A sweep frequency oscillator for delivering substantially constant power output over the sweep band of frequencies in accordance with claim 5, wherein the Q of said second resonant cavity is approximately between .3 and .4 of said first resonant cavity and the product of the Q of said second resonant cavity and the coefficient of coupling between said two cavities is approximately between .8 and .9.

References Cited in the file of this patent

UNITED STATES PATENTS

| | | |
|---|---|---|
| 2,470,802 | Braden | May 24, 1949 |
| 2,493,091 | Sproull | Jan. 3, 1950 |
| 2,517,731 | Sproull | Aug. 8, 1950 |
| 2,562,927 | Levinthal | Aug. 7, 1951 |
| 2,624,864 | Herlin et al. | Jan. 6, 1953 |
| 2,639,404 | Everhart et al. | May 19, 1953 |